UNITED STATES PATENT OFFICE.

HAROLD EDWIN CLEAVES, OF WASHINGTON, DISTRICT OF COLUMBIA.

PROCESS FOR TREATING ORES.

1,239,885. Specification of Letters Patent. Patented Sept. 11, 1917.

No Drawing. Application filed March 9, 1917. Serial No. 153,663.

*To all whom it may concern:*

Be it known that I, HAROLD EDWIN CLEAVES, a citizen of the United States, residing at Washington, in the District of Columbia, have invented new and useful Improvements in Processes of Treating Ores, of which the following is a specification.

This invention relates to a process of treating ores and compounds which contain one or more of the metals of the fifth and sixth groups of the periodic system associated with undesirable metals or metalloids; and comprises subjecting such ores and compounds, while maintained at a high temperature, to the action of a gaseous reagent such as hydrogen chlorid.

The invention pertains especially to the treatment of ores and compounds containing the acid-forming metals, vanadium, columbium, tantalum, chromium, molybdenum, tungsten and uranium; and has for its object the separation of said metals from undesirable metals or metalloids, substances with which they happen to be chemically or physically associated.

The new process has the advantage that it is as applicable to the working of low grade ores and low grade concentration products as it is to the treatment of high grade material, thus making practicable the recovery of values from an ore product usually considered as having but little commercial value.

The process, generally speaking, consists in treating the ore or compound with a gaseous reagent capable of reacting with metals in the ore to form volatile metal compounds, while maintaining the ore at a temperature at which one or more of the metal compounds thus formed will be volatilized and carried away by the current of gas.

The solution and reduction processes used on these ores in present day practice have certain disadvantages which are avoided by this new process. The solution methods usually require considerably more time for the reactions to reach completion, and involve the frequent handling and filtration, etc., of large quantities of solutions. The reduction methods are not adapted to the treatment of low grade ores on account of the presence of considerable percentages of silica or other gangue-forming minerals, or to high grade ores containing objectionable quantities of deleterious elements such as sulfur, phosphorus, arsenic, etc. The recoveries obtained by these processes are also in general relatively low.

I have discovered that if ores, such as those above described, be subjected at a high temperature, for example above a red heat, to the action of a current of gas containing hydrogen chlorid, preferably in excess and under reducing conditions, the formation and volatilization of the chlorids of the acid-forming metals and of some other metals which may be present and of the hydrids of the metalloids, is effected with remarkable rapidity. The velocity of the reaction under these conditions is evidently caused by the volatilization and removal of the metal chlorids as soon as they are formed, thus preventing a reverse reaction from taking place, and allowing the hydrogen chlorid free access to fresh surfaces of the ore.

The process as carried out with an ore containing a metal of the sixth group may be illustrated in greater detail by the following examples:—

Example I: A tungsten ore such as a ferberite ore, consisting principally of $Fe(Mn)WO_4$ and silica, is ground and placed in a thin layer in a furnace suitably lined with a material, such as clay, capable of resisting the action of hydrogen chlorid. Dry hydrogen chlorid is then passed over the ores, heated to about 900–1100° C., and together with the volatilized products is led into water or aqueous HCl. The iron chlorid goes into solution in the water or hydrochloric acid, whereas the tungsten chlorid is immediately hydrolyzed by the water or hydrochloric acid to tungstic acid which precipitates and may be readily separated. The unused hydrogen chlorid, after being freed from volatilized chlorids, water vapor, etc., is again passed over the heated ore. When the reaction is completed the residue in the furnace consists mainly of silica, the iron, tungsten and any manganese that was present, having been completely removed.

A similar result is obtained with ores containing other tungsten minerals such as wolframite, $(Fe,Mn)WO_4$; hubnerite, $Mn(Fe)WO_4$; cuprotungstate, $CuWO_4$; and stolzite, $PbWO_4$.

Instead of heating the ore to a temperature at which the chlorids of two or more metals are volatilized, the temperature may be kept at a point at which only one of the metal chlorids will be volatilized and removed, thus effecting a separation in the first stage of the process. For instance when ores containing scheelite, $CaWO_4$, are treated as in the above example, tungsten chlorid is volatilized while calcium chlorid remains in the furnace with the silica.

Example II: A chromite ore containing ferrous chromite $(Fe(CrO_2)_2)$ and silica, is finely ground, (so as to pass for instance through a 100 mesh sieve), placed in a furnace as in Example I, and heated to about 1100° C. Dry hydrogen chlorid is passed over the heated material and the resulting gases led into water. When the operation is completed there is left in the furnace chromic chlorid and silica, the iron having been completely removed. The chromic chlorid may be readily separated from silica by dissolving it in water, and is then in a form in which it can be easily converted into chromates and bichromates.

Sulfids if present are decomposed to form chlorids of the metals, which may or may not be volatilized, and hydrogen sulfid. Differences in the rate of decomposition of various sulfids however may afford methods of separating them commercially as in the following example:—

Example III: An ore containing molybdenite ($MoS_2$), chalcopyrite (CuFeS) and quartz, may be freed from chalcopyrite by subjecting it to hydrogen chlorid in the manner above described. The molybdenite appears to be attacked but slowly, so that no appreciable formation of molybdenum chlorid occurs up to the time of the practically complete decomposition of the chalcopyrite and volatilization of the resulting compounds.

When it is desired to separate from an ore metals whose chlorids have a tendency to decompose at the boiling point, it is advantageous to use an excess of hydrogen chlorid, since the presence of the latter appears to retard or prevent this decomposition and permits the metal to be withdrawn in the form of its chlorid at a temperature considerably lower than the boiling point of the metal itself.

When two or more metal chlorids are volatilized and carried off by the current of gas, they may be separated by various methods other than that mentioned in the specific example; as, for instance, by precipitation from solution or by fractional condensation.

One of the great advantages pertaining to the new process is that it may be applied directly to the raw ore, suitably comminuted, without necessitating a preliminary concentration or chemical treatment, since the quartz and silicates do not interfere appreciably with the reaction.

Where the ores contain the iron and tungsten, etc., in combination with an excess of the metalloids, oxygen and sulfur, the reaction leads to the formation of water and hydrogen sulfid. To prevent excessive decomposition of hydrogen chlorid by these metalloids with liberation of chlorin, it is desirable to carry on the reaction in the presence of hydrogen or other reducing agent, which also serves to hinder reoxidation of the metal chlorid.

Other hydrogen halids, such as hydrogen fluorid, may be used in place of hydrogen chlorid, but they are not as serviceable as the latter, involving greater difficulties in manipulation.

I claim:

1. The process of treating ores or compounds which contain one or more of the metals of the fifth and sixth groups associated with undesirable metals or metalloids, which comprises treating such ores or compounds with a non-oxidizing gas containing hydrogen chlorid and no more reducing agent than is necessary to prevent the formation of free chlorin by reacting with any excess of metalloids over the amount which can combine with the hydrogen liberated in the formation of metal chlorid, while maintaining the ore or compound at a temperature at which one or more metal chlorids will be formed and volatilized.

2. The process of treating ores which contain one or more of the acid-forming metals vanadium, columbium, tantalum, chromium, tungsten, molybdenum and uranium, which comprises treating the ore with hydrogen chlorid substantially free from oxidizing and reducing agents, while maintaining the ore at a temperature at which one or more of the metal chlorids formed will be volatilized, and removing the volatilized chlorid or chlorids.

3. The process of treating an ore containing a metal of the sixth group which comprises passing in contact with the ore a current of hydrogen chlorid substantially free from oxidizing and reducing agents, while maintaining the ore at a temperature at which one or more of the chlorids formed will be volatilized, and causing the current of gas to sweep out the volatilized chlorid or chlorids.

4. The process of treating an ore containing a metal of the sixth group which comprises passing in contact with the ore a current of gas containing hydrogen chlorid and no more of a gaseous reducing agent than is necessary to prevent the formation of free chlorin by reacting with any excess of metalloids over the amount which can combine with the hydrogen liberated in the formation of metal chlorid, while maintaining the ore at a temperature at which one or more of the chlorids formed will be volatilized, and causing the current of gas to sweep out the volatilized chlorid or chlorids.

5. The process of treating an ore containing a metal of the sixth group which comprises passing in contact with the ore a current of hydrogen chlorid substantially free from oxidizing and reducing agents in excess of that required to convert the metal into its chlorid, while maintaining the ore at a temperature at which one or more of the chlorids formed will be volatilized, and causing the current of gas to sweep out the volatilized chlorid or chlorids.

6. The process of recovering acid-forming metals from oxygen compounds thereof containing metal or metalloid impurities, which comprises treating the impure compound with hydrogen chlorid substantially free from oxidizing and reducing agents, while maintaining said compound at a temperature at which a chlorid of a metal impurity and volatile compounds of the metalloids will be formed and volatilized, and removing the volatilized substances.

7. The process of treating a material containing a metal of the fifth and sixth groups, which metal is present in an acid radical combined with another metal, which comprises passing substantially pure hydrogen chlorid in contact with said material while maintaining the latter at a temperature at which one or more of said metals will be converted into its chlorid and volatilized.

8. The process of treating a material containing a refractory mineral which has a molecular structure similar to a metal molybdenate, which comprises passing hydrogen chlorid substantially free from oxidizing and reducing agents in contact with said material while maintaining the latter at a temperature at which one or more of the metals will be converted into its chlorid and volatilized.

9. The process of treating an ore containing a metal tungstate which comprises subjecting the ore to the action of hydrogen chlorid while maintaining the ore at a temperature at which one or more of the metal chlorids formed will be volatilized, and removing the volatilized chlorid or chlorids.

10. The process of treating an ore containing a metal tungstate which comprises passing in contact with the ore a current of gas substantially free from oxidizing agents and containing hydrogen chlorid in excess of that required to convert the metal content of the ore into chlorids, while maintaining the ore at a temperature at which the metal chlorids formed will be volatilized, removing the volatilized chlorids in the stream of gas, and then removing therefrom the tungsten chlorid.

11. The process of treating an ore containing an iron tungstate which comprises passing a current of gas containing hydrogen chlorid in contact with the ore maintained above a red heat, so as to volatilize and remove the iron and tungsten chlorids as soon as they are formed.

12. The process of treating an ore containing an iron tungstate which comprises passing a current of gas containing hydrogen chlorid in contact with the ore maintained above a red heat, so as to volatilize and remove the iron and tungsten chlorids as soon as they are formed, and passing the stream of gas containing metal chlorid into water to separate the tungsten in the form of a tungsten oxid precipitate.

In testimony whereof I affix my signature.

HAROLD EDWIN CLEAVES.